United States Patent [19]

Slusky

[11] Patent Number: 5,487,111
[45] Date of Patent: Jan. 23, 1996

[54] TELECOMMUNICATIONS SYSTEM SEQUENCE CALLING

[75] Inventor: Ronald D. Slusky, Highland Park, N.J.

[73] Assignee: AT&T IPM Corp., Coral Gables, Fla.

[21] Appl. No.: 99,114

[22] Filed: Jul. 29, 1993

[51] Int. Cl.$^6$ ..................................................... H04M 1/72
[52] U.S. Cl. ........................... 379/211; 379/210; 379/201; 379/212
[58] Field of Search .................. 379/40, 51, 92, 379/216, 210, 211, 212, 213, 201, 67, 221

[56] References Cited

U.S. PATENT DOCUMENTS

| | | | |
|---|---|---|---|
| 4,674,115 | 6/1987 | Kaleita et al. | 379/201 |
| 4,723,273 | 2/1988 | Diesel | 379/211 |
| 4,736,405 | 4/1988 | Akiyama | 379/211 |
| 4,807,279 | 2/1989 | McClure | 379/211 |
| 4,878,243 | 10/1989 | Hashimoto | 379/210 |
| 5,199,062 | 3/1993 | Von Meister et al. | 379/67 |
| 5,206,901 | 4/1993 | Harlow et al. | 379/211 |
| 5,222,125 | 6/1993 | Creswell et al. | 379/201 |
| 5,243,645 | 9/1993 | Bissell | 379/211 |
| 5,253,288 | 10/1993 | Frey | 379/210 |
| 5,260,986 | 11/1993 | Pershan | 379/213 |
| 5,274,700 | 12/1993 | Gechter | 379/210 |
| 5,329,578 | 7/1994 | Brennan et al. | 379/211 |
| 5,369,695 | 11/1994 | Chakravarti et al. | 379/211 |
| 5,384,831 | 1/1995 | Creswell et al. | 379/211 |

*Primary Examiner*—Jeffery A. Hofsass
*Assistant Examiner*—Scott Wolinsky
*Attorney, Agent, or Firm*—Frederick B. Luludis; Ronald D. Slusky

[57] ABSTRACT

A method for use in a telecommunications system in which a call sequencing facility allows a caller who is trying to reach a called subscriber to be routed to each of a sequence of telephone numbers specified by the subscriber, even though a call placed to one such telephone number is answered.

20 Claims, 9 Drawing Sheets

| PHONE.NUM | SUB.LANG | SUB.PIN | HOME.PHONE | 300 |
|---|---|---|---|---|
| NU | NUM.CIN | NU | NUM.MSG | |
| CALL.SEQ | CFNUM3 | CFNUM2 | CFNUM1 | |
| CIN4 | CIN3 | CIN2 | CIN1 | |

5,487,111

TELECOMMUNICATIONS SYSTEM SEQUENCE CALLING

BACKGROUND OF THE INVENTION

The present invention relates to the processing of telephone calls in a telecommunications system.

Among the various forward-looking concepts being implemented or planned for the balance of the decade, and beyond, is the notion of sequence calling. Once this feature is deployed, a telephone service subscriber will be enabled to specify to the telecommunications infrastructure a sequence of telephone numbers to which a call to the subscriber can be routed until the subscriber is "found". For example, a subscriber to a "700" telephone number, such as a so-called personal EasyReach™ 700 number obtained from AT&T, will be able to specify that a call made to that number should be routed, for example, first to the subscriber's office telephone number and then, if no answer there, to the cellular telephone number associated with the subscriber's car telephone and, if no answer there, to the subscriber's home telephone number. The prior art in this regard is typified by the technology described in U.S. Pat. No. 5,222,125 issued to C. W. Creswell et al on Jun. 22, 1993.

SUMMARY OF THE INVENTION

The present invention is directed to an enhancement to sequence calling. In accordance with the invention, and in a departure from the prior art, a mechanism is provided for allowing a call to be routed to a telephone number in the sequence even if the call had been completed, or "answered," at a previous telephone number in the sequence. This technique solves a problem that the present inventor has recognized will occur when sequence calling is actually deployed as a commercial offering. The problem is the fact that a call may be answered even if the subscriber is not available at the called location. For example, a call to an office may be answered by a secretary or co-worker; a call to a home may be answered by a family member other than the subscriber. I have realized that having the calling sequence terminated in such a situation frustrates the subscriber's intention and expectation that the telephone system will forward his/her calls to each of the telephone numbers in the sequence until the subscriber is "found," which is the real purpose of providing call sequencing.

The invention can be implemented in any of a number of ways. However, in preferred embodiments, the system is responsive to a request from the caller to disconnect the call from a present answered (or ringing) location and to initiate a connection to the next number in the sequence. The request from the caller could be, for example, a specific code (such as *#) input from the telephone keypad or could be a spoken command (such as the word "next"). Advantageously, the caller may be presented a recorded announcement when the subscriber's "700" or other telephone number is first dialed, that announcement providing such information as the fact that the subscriber has specified a list of telephone numbers; that these telephone numbers can be tried in sequence; and that the caller can cause the call to proceed to the next number on the list at almost any point in time by inputting the code or speaking the command.

DETAILED DESCRIPTION

Figures 1, 2:
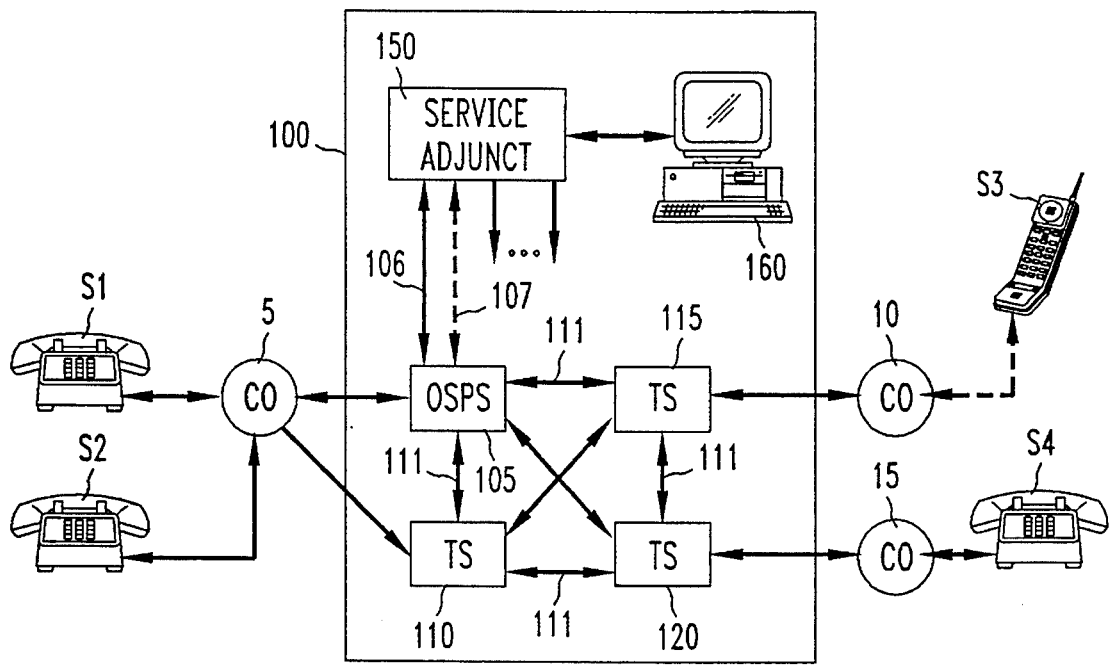
FIG. 1 is a block diagram of a communications network which includes a service adjunct implementing a personal telephone number service.
FIG. 2 shows a number of the fields of a record containing profile information for a subscriber to the service.
Figure 3:
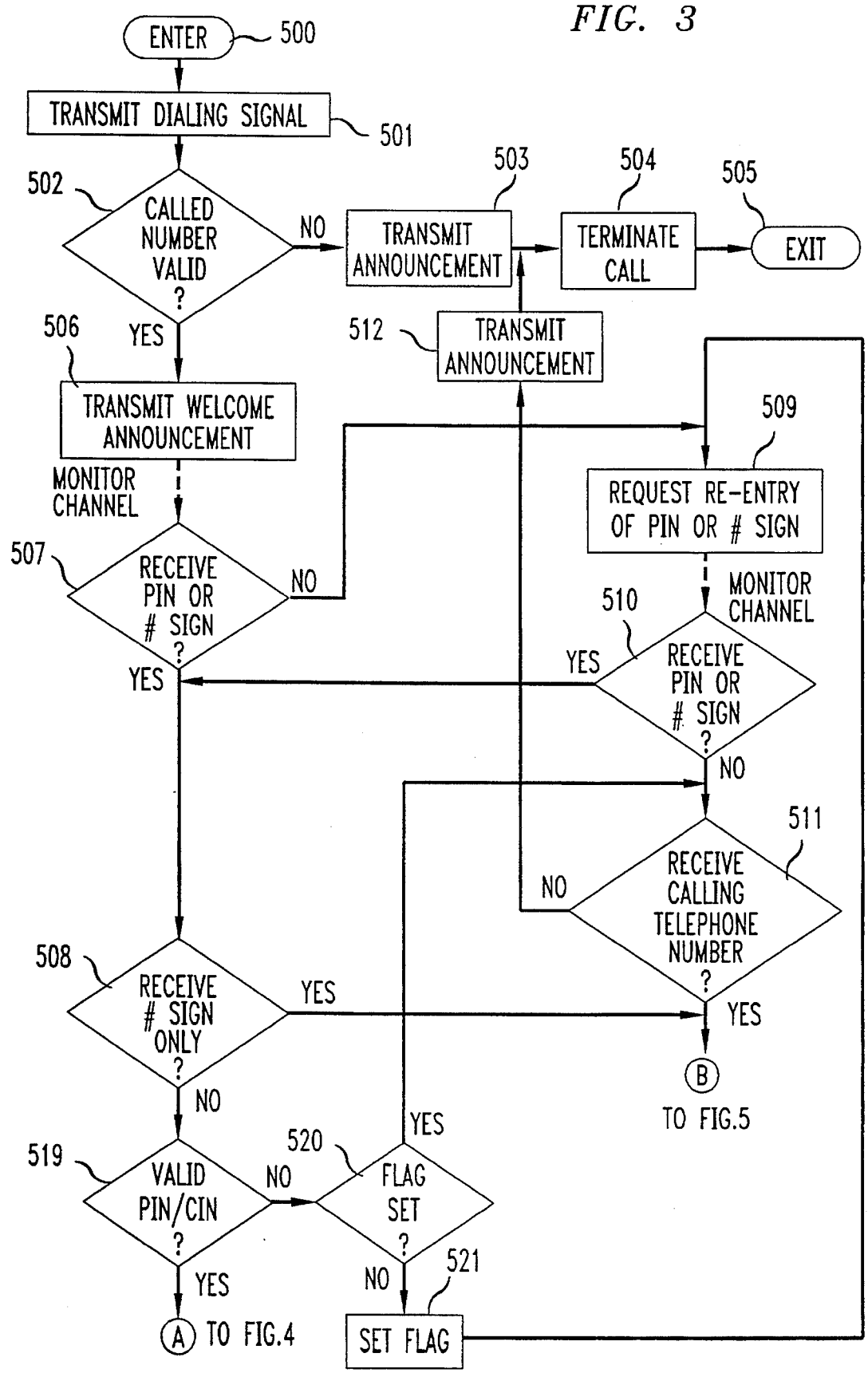
FIGS. 3–8 show in flow chart form the program which implements the principles of the invention in the service adjunct and Operator Service Position System (OSPS) shown in FIG. 1.
Figure 4:
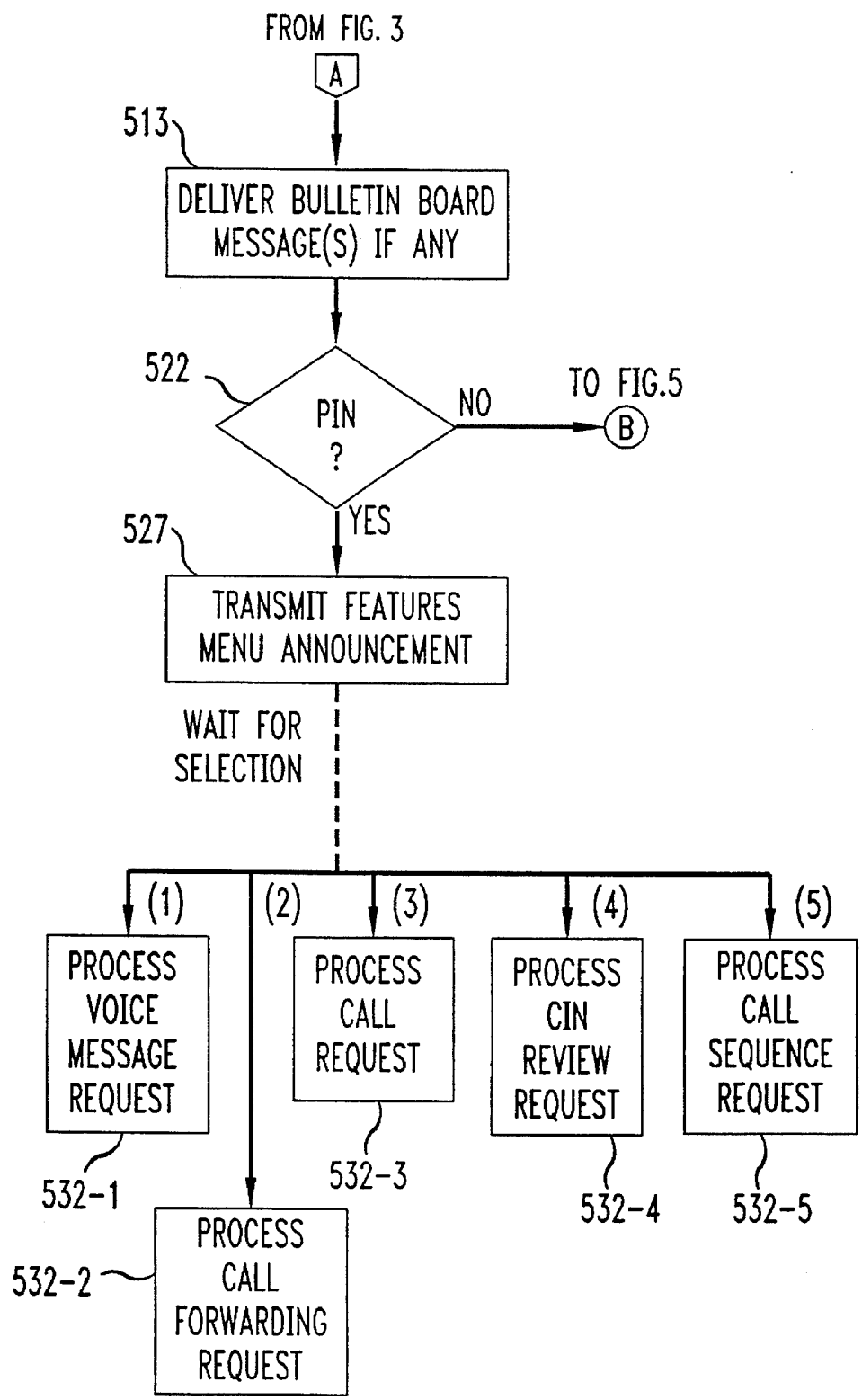

FIG. 1 shows a public switched telephone network 100 that provides long distance telephone services for its subscribers, such as the subscribers associated with telephone stations S1 through S4. Network 100 includes, inter alia, a plurality of Toll Switching (TS) offices, or switches, three of which—110, 115 and 120—are shown. Network 100 also includes a plurality of Operator Service Position System offices (OSPS), one of which—105—, is shown. The switches and OSPS offices are interconnected via an intertoll network 111. A switch and OSPS office may also be connected to one or more local Central Offices (CO), such as COs 5, 10 and 15, which respectively serve stations S1 through S4, where station S3 represents a mobile telephone station.

Included in network 100 is service adjunct 150 which processes calls placed to a subscriber of a personal telephone number service in accordance with a telecommunications service profile associated with that subscriber. As described in detail hereinbelow, the information contained in the profile can be entered and/or changed by the subscriber via interaction with a voice interactive system.

CREATION OF THE SUBSCRIBER PROFILE

A telephone user, illustratively calling from station S 1, may subscribe to the personal telephone number service by dialing a predetermined telephone number, which causes network 100 to establish a connection to terminal 160 attended by a service representative. As a result of interacting with the representative, the new subscriber is assigned a unique personal telephone service number. In the illustrative embodiment, the personal telephone number is prefixed by the service code "700".

Associated with the personal telephone number is a Personal Identification Number (PIN), and as many as four Caller Identification Numbers (CINs). As will be discussed below, a subscriber may define different call treatments for different ones of the subscriber's associated CINs. Also, different billing modes are associated with the CINs. A subscriber's PIN and CINs may be distinguished from one another by the number of digits forming those identifiers, for example, five and four, respectively.

As a further result of such interaction, the service representative positioned at terminal 160 causes a data record defining a profile for the new subscriber to be stored in memory internal to adjunct 150. An illustrative example of a such a record 300 is shown in FIG. 2, in which one or more of the fields define a particular aspect of the personal telephone number service as follows:

HOME.PHONE—defines the subscriber's home telephone number.

SUB.PIN—defines the PIN assigned to the associated subscriber and may further define an associated secondary subscriber PIN.

SUB.LANG—identifies a particular language in which announcements are to be made to the subscriber.

PHONE.NUM—defines the unique subscription telephone number, e.g., 700-555-2234, assigned to the associated subscriber.

NUM.MSG—defines the number of voice messages stored in a messaging service system (not shown) for the associated subscriber.

NUM.CIN—defines the number of CINs assigned to the associated subscriber.

CFNUM. 1-3—define respective call forwarding numbers when programmed by the subscriber.

CALL.SEQ—when set indicates that call sequencing, embodying the principles of the present invention, is in effect.

CIN. 1-4—define respective CINs and their respective call treatments as specified by the subscriber.

NU—indicates that the field is not used or is not pertinent to the present invention.

Once the profile information has been stored in record 300, the subscriber may thereafter interact with adjunct 150 and update the record to (a) invoke particular calling features, (b) change the values of one or more of the assigned CINs, (c) change various call forwarding numbers or (d) activate call sequencing.

A subscriber may update the profile by dialing his/her service number, e.g., 0-700-555-2234, to establish a network 100 connection to adjunct 150 via an OSPS switch, e.g., OSPS 105. OSPS 105, responsive to receipt of the call via CO 5, forwards the call to adjunct 150 via communication path 106. In an illustrative embodiment of the invention, path 106 may be, for example, a T1 carrier voice channel. OSPS 105 also passes associated calling information to adjunct 150 via data path 107. The calling information includes, inter alia, (a) the calling and called personal telephone numbers, (b) an indication of the T1 channel carrying the call and (c) a unique call identifier that OSPS 105 associates with the call. OSPS 105 and adjunct 150 use the call identifier to exchange via path 107 signaling information (messages) relating to the call, as will be discussed below. Responsive to the receipt of the call and associated calling information, adjunct 150 translates the received called personal telephone number into an internal memory location and unloads therefrom the data record 300 associated with that telephone number. Adjunct 150 then prompts the calling party (subscriber in this instance) to enter a caller identification number or, in the event that the caller has not been given a caller identification number by the subscriber, the pound sign (#). In this example, the calling subscriber enters, via the associated station set keypad, e.g., station S1, his/her assigned PIN. Adjunct 150, responsive to receipt thereof, compares the value of the received PIN with the value of PIN contained in the associated subscriber data record. In this instance, adjunct 150 would find that the former and latter values match one another and therefore returns to the calling subscriber a prerecorded announcement listing a number of calling features that the subscriber may access and/or update.

An illustrative example of the aforementioned calling features announcement, which is presented in the language defined in the SUB.LANG field, is as follows:

"Welcome to your personal telephone number service system.
To hear your voice messages -- press one,
to program or review call forwarding numbers -- press two,
to call home or place a call -- press three, (1)
to access your caller identification numbers -- press four,
to activate call sequencing -- press five,
to terminate this call, press star pound [i.e., *#]".

This announcement is the highest level audible "menu" of the menu "tree" presented to subscribers, and the entering of one of the digits "1" to "5" in response to this menu causes the system to present further menus and submenus further down in the tree, as will be seen as this description continues.

Assuming that the subscriber, responsive to announcement (1), enters the digit "1" by pressing the corresponding keypad button of station set S1, then adjunct 150, responsive thereto, unloads the contents of the NUM.MSG field of the associated record. If the contents of that field equals zero, then adjunct 150 transmits a message indicative of that fact to the calling subscriber.

If the value of the contents of the NUM.MSG field is greater than zero, then adjunct 150 returns a message reciting the contents of the latter field and presents a menu inviting access to the stored messages.

The subscriber may accept or decline that invitation by entering a respective keypad digit.

If, on the other hand, the calling subscriber desires to program call forwarding numbers and therefore in response to announcement (1) enters the digit "2", then adjunct 150 responds with a menu announcement detailing options that the subscriber may elect in connection with the call forwarding feature. An illustrative example of such a menu announcement is as follows:

"To review call forwarding numbers -- press one,
to program call forwarding numbers -- press two, (2)
to return to main menu, press star pound [i.e., *#]"

If the subscriber, in response to announcement (2), enters the digit "1", then adjunct 150 transmits a verbal accounting of the contents of the CFNUM. 1-3 fields, and presents the subscriber with a menu offering the opportunity to cancel any one or more of them.

If the subscriber enters the digit "2", adjunct 150 prompts him/her to enter up to (in this case) three ten-digit call forwarding telephone numbers; to designate a particular one (or none) of them, as being the number to which calls are to be forwarded; and to designate the date and/or time during which call forwarding to any particular one of the call forwarding telephone numbers is to be effective. Adjunct 150 confirms the entry of these various pieces of information by returning an announcement indicative thereof and presents the subscriber with the option of changing or approving it. Once approved, the data are stored in associated subfields (not shown) of the CFNUM. 1-3 fields of the associated record. The selection of a particular number to which calls are to be forwarded during any period overrides any previous activation of call sequencing (discussed below) for that period.

After the subscriber has exited the call forwarding feature by entering "*#", adjunct 150 retransmits announcement (1). Assuming, now, that the calling subscriber enters the digit "3" in response to that announcement, then adjunct 150 transmits a prompt to determine if the subscriber desires to place a call to his/her home or some other location.

Assuming that the calling subscriber elects to call some other location, then adjunct 150, responsive thereto, requests entry of the ten-digit telephone number that the calling subscriber desires to call. Upon receipt of the last such digit, it then sends to OSPS 105 a data message containing, inter alia, the call identifier, ten digit telephone number entered by the subscriber, and a request requesting that the subscriber's call be forwarded to the latter telephone number. At that point, adjunct 150 relinquishes control over the call. If the subscriber had indicated a desire to call home, the telephone number stored in the HOME.PHONE field would have been inserted in the aforementioned data message instead. In either case, as will be discussed below, adjunct 150 directs OSPS to bill the call to the subscriber's telephone service number.

OSPS 105, in response to receipt of the data message and in a conventional manner, forwards the call to the telephone station identified by the called telephone number contained in the message. For example, if the latter telephone number is associated with station S4 (FIG. 1 ), then OSPS 105 passes the call via intertoll path 11 to toll switch 120. Switch 120, in turn, forwards the call to station S4 via CO 15. In doing so, OSPS 105 creates a billing record to track the time and charges for the associated call.

The subscriber is also provided with the capability of interacting with adjunct 150 for the purpose of administering the subscriber's CINs. Briefly, the subscriber invokes that capability by entering the digit "4" in response to hearing announcement (1). Adjunct 150, in response thereto, presents the user with a menu and submenus thereof detailing a number of different options relating to (a) adding, deleting, renaming and/or specifying the call treatments that are to be accorded to a respective caller identification number or (b) reviewing such numbers.

From time to time, the subscriber may want to be reached at any one of a sequence of different telephone numbers and, more particularly, at any one of those numbers even though a call placed to another one of those numbers that is earlier in the sequence is answered by someone other than the subscriber. That is, the subscriber is not present at the called location to take the call, but may be present at a location associated with one of the other telephone numbers. To this end and in accord with an aspect of the invention, a mechanism is provided for allowing a call to be routed to a telephone number in the sequence even if the call had been completed, or "answered," at a previous telephone number in the sequence. The subscriber may invoke such a call sequencing mechanism by entering the digit "5" in response to announcement (1). Adjunct 150, in response thereto, transmits a prompt requesting entry of (a) a specification of the order in which calls are to be forwarded to the telephone numbers stored in fields CFNUM.1-3, (b) date and time during which the call sequencing is to be in effect, including the option that call sequencing is to be in effect until it is canceled by the subscriber or in the event that single number call forwarding is activated, as discussed above, subsequent to the activation of call sequencing. Adjunct 150 confirms the entry of the various responses by returning announcements indicative thereof and presenting the subscriber with the option of changing or approving them. Once approved, the data are stored in respective subfields of the CALL. SEQ field of the associated record.

Thereafter, when a user other than the subscriber places a call to the subscriber's service number, then adjunct 150 advises the caller that call sequencing is in effect. Adjunct 150 also advises the caller that he/she may sequence through the subscriber's call forwarding numbers, as will be described below detail. It suffices to say at this point, however, that adjunct 150 forwards the call via OSPS 105 to a station associated with a first telephone number, e.g., the particular one of the telephone numbers stored in fields CFNUM. 1-3 designated to be the first in the sequence— illustratively the telephone number in field CFNUM. 1. If the called number is busy or if the person answering the call is not the subscriber, then the caller may request call sequencing by entering, for example, the star (*) sign followed by the pound (#) sign. OSPS 105, responsive to receipt of the signals characterizing that request, terminates the connection to the called station, but retains the connection to the calling station. OSPS 105 then reconnects the calling station to adjunct 150. In addition, OSPS 105 forwards via path 107 a message containing, inter alia, (a) calling and called numbers (b) subscriber's personal service telephone number, (c) call identifier and (d) information indicating a calling party request for call sequencing. At that point, adjunct 150 obtains the next telephone number in the sequence-illustratively, the telephone number contained in the CFNUM2 field of the associated record-and then forwards the call to OSPS 105. In doing so, adjunct 150 sends a message containing, inter alia, (a) calling number, (b) new call sequencing number, (c) subscriber personal service telephone number and (d) call identifier, as will be explained below.

Similarly, if the latter call is busy or is answered by a person other than the subscriber, then the caller may again request call sequencing in the described manner. In that event, adjunct 150 forwards the call via OSPS 105 to a next telephone number in the sequence, illustratively, the telephone number stored in the CFNUM3 field of the associated record. Thus, in accord with the invention, the caller may cause adjunct 150 to sequence through each of the telephone numbers specified by the subscriber until the caller reaches the subscriber. However, if the caller is still unable to reach the subscriber after the associated call has been forwarded to the last of such telephone numbers, then adjunct 150 provides to the caller the option of leaving a message for the called subscriber.

CALL PROCESSING

Referring to FIGS. 1 and 3–8, assume that a caller, who may be the subscriber, dials the subscriber's personal telephone number 700-555-2234. The call is ultimately extended to service adjunct 150 via a network 100 switch, e.g., OSPS 105 as a result of dialing a prefix of zero ("0"), and thence via one of the T1 channels of path 106. Upon receipt via data path 107 of a call set-up message containing, inter alia, (a) called and calling numbers, and (b) a particular call identifier that OSPS 105 associates with the call and (c) the channel carrying the call, as mentioned above, the adjunct 150 program responds to the receipt thereof and returns a dialing signal, e.g., a "bong", over the associated channel to alert the calling party that the desired connection has been established (block 501 ).

The program then forms a message containing the received called number (e.g., 700-555-2234) and a request to validate the number, and sends the message to an associated database manager, discussed below. The latter, in turn, determines (block 502) if a subscriber record has been assigned to the called number. If thus, then the database manager transmits a message indicating that the called number is valid back to the transaction processor. Otherwise, the message indicates that the called number is not valid, which causes the program to transmit over the path 106 channel an announcement indicating that the called number is not in service (block 503). The program then terminates the call (block 504) by sending a call termination message containing the associated call identifier over path 107 to OSPS 105. OSPS 105, upon receipt of the latter message, terminates the call connection in a conventional manner.

If the called number is valid, then the program transmits a prerecorded "welcome" announcement (block 506) requesting entry of a personal identification number over the associated channel. The following is an example of such announcement:

> "Welcome to the personalized calling system. If you are calling from a touch-tone telephone and have a personal calling identification number, please enter it now followed by the pound sign. Otherwise, just press the pound sign." (4)

The program then monitors the path 106 channel for receipt of an identification (ID) number, i.e., a PIN, CIN or, alternatively, the # sign. If at the end of, for example, ten seconds, no ID number or # sign was received (block 507), a re-entry message is transmitted (block 509). If neither an ID number nor a # sign is received this time (block 510), the program transmits a message indicating that the call will be terminated (block 512) and then terminates the call (block 504) in the manner described above.

Figure 5:
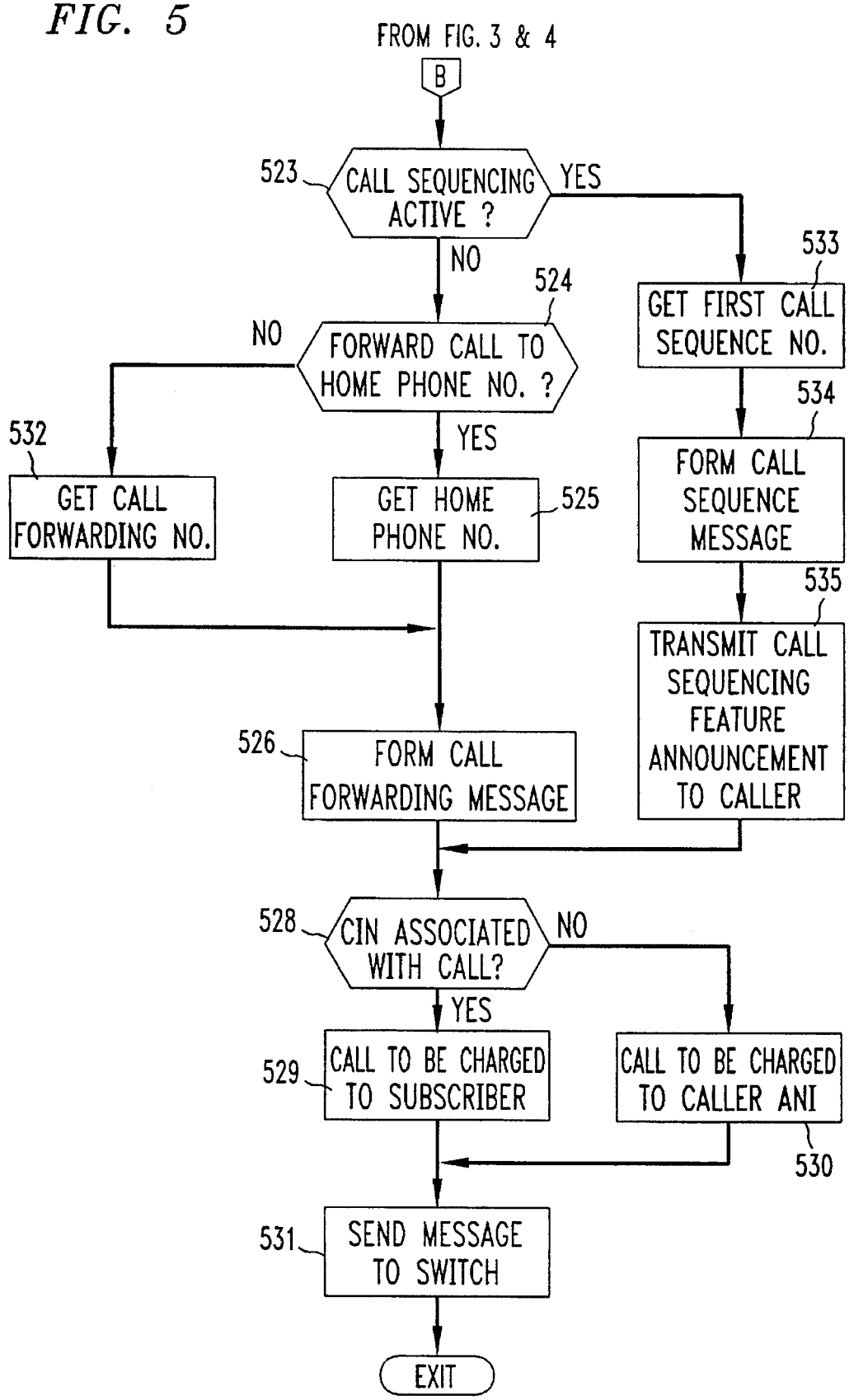
Figure 6:
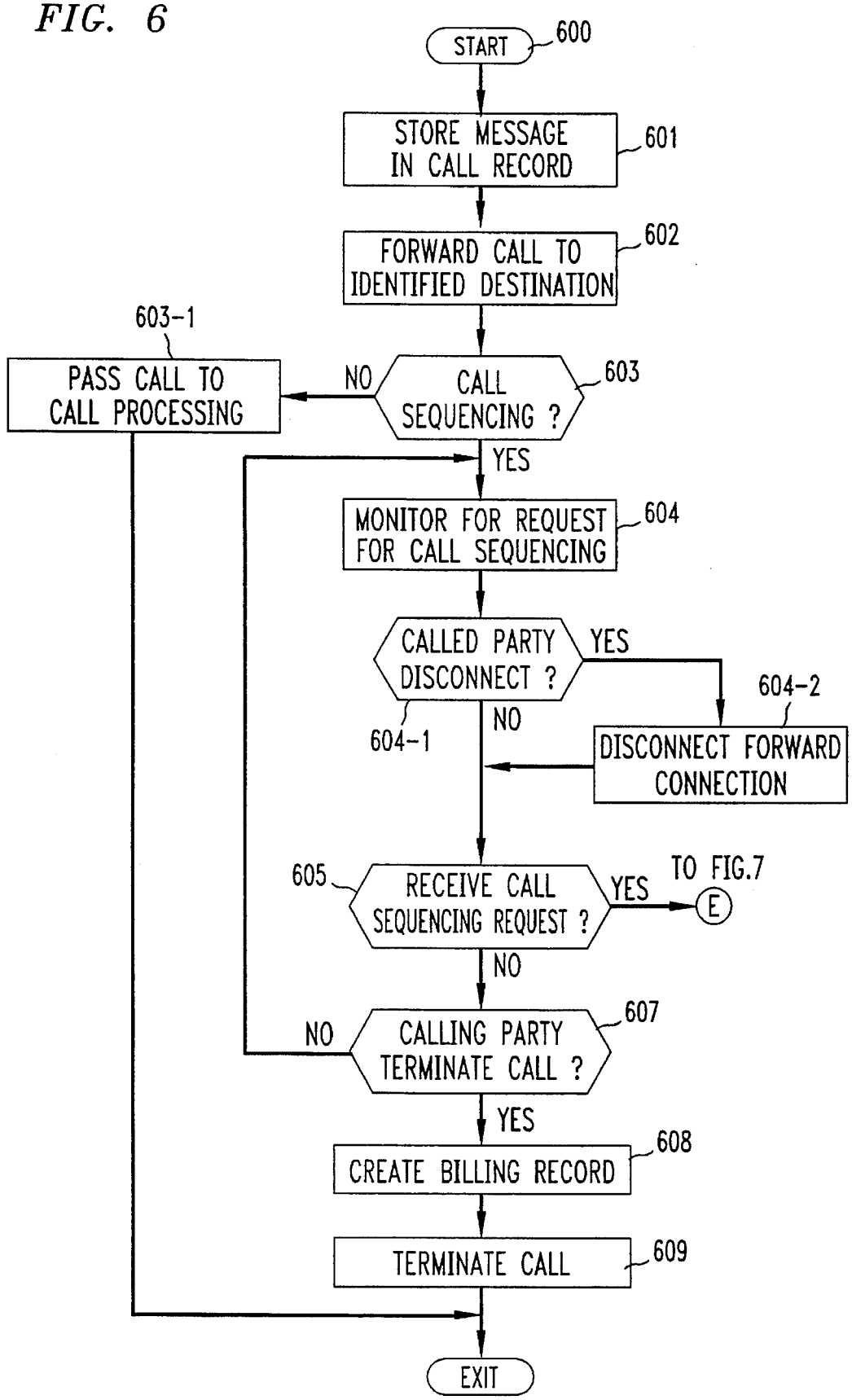
Figure 7:
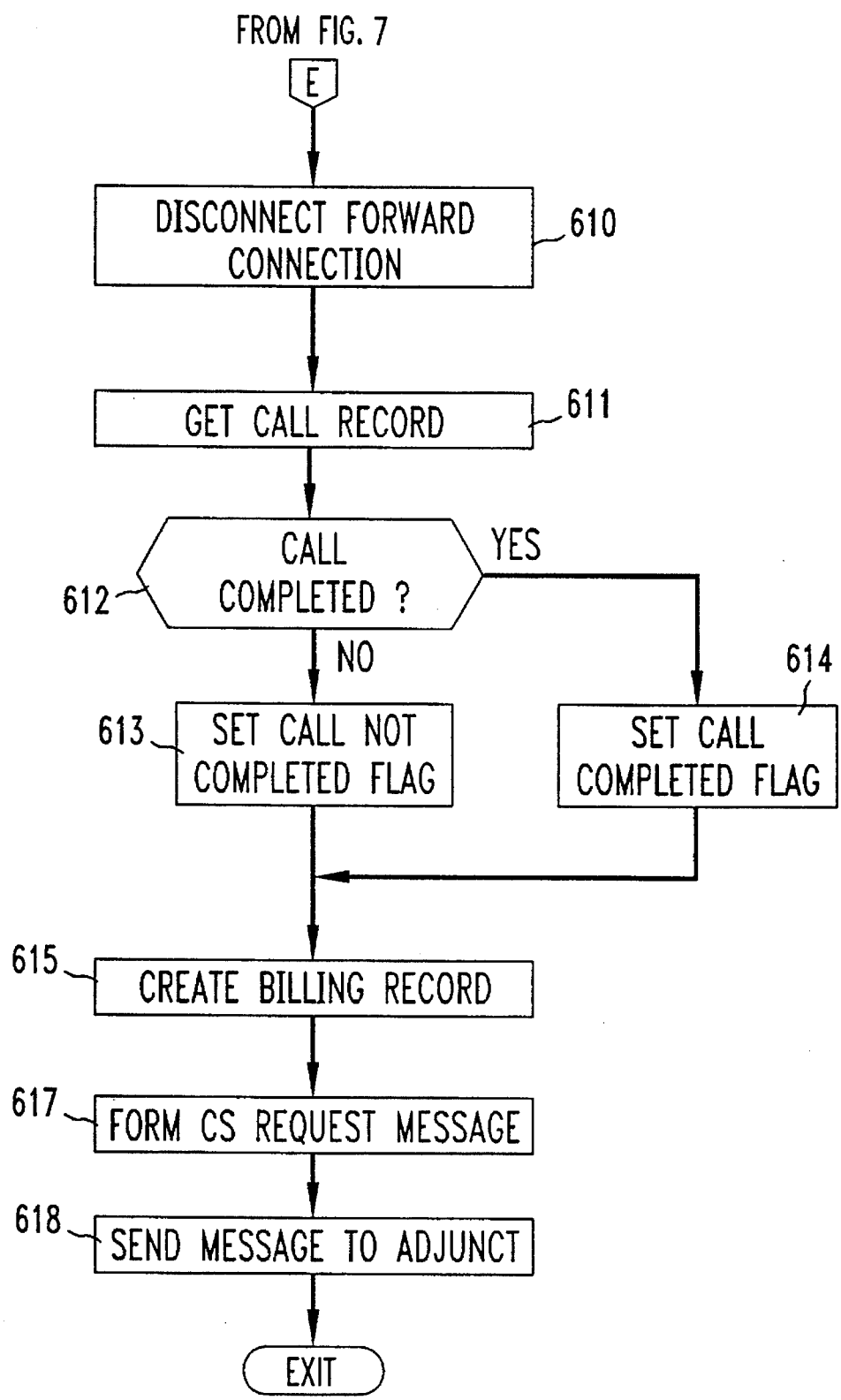

If, on the other hand, the program finds that the calling party responded to the welcome announcement (block 507 or block 510), then it checks (block 508) to see if that party entered just the # sign. If that is the case, then the program proceeds to block 523 (FIG. 5). If, on the other hand, the calling party has entered an ID number, then the program checks (block 519) the validity of the entry (PIN or CIN) by launching a query to the aforementioned database.

If the return message from the database indicates that the entry is not valid, then the program checks to see if it has set a retry flag for the current call (block 520). If the flag is set, meaning that this is the second entry of an invalid ID, then the program proceeds to terminate the call via blocks 512 and 504. If the retry flag is not set, then the program sets it (block 521) and then requests re-entry of an ID or # sign (block 509).

If the database message indicates that the entry is valid, then the program, operating in conjunction with the database, delivers (block 513) any voice messages that may have been stored in the database for the caller. The program then checks the entered identity number (block 522) to determine if it was a PIN, i.e., contains five digits. If it was not, then the program checks to see (523, FIG. 5) if call sequencing is active. If it is not, then the program (524) determines if the call should be forwarded to the subscriber's home telephone number and unloads the latter number from the associated subscriber record (block 525) if it finds that to be the case. The program (block 526) then forms a Call Forwarding (CF) message containing, inter alia, (a) called subscriber number, (b) calling number, (c) telephone number to be called and (d) call identifier that OSPS 105 associated with the incoming call. The program then determines if the caller entered a CIN (block 528) and, if that is the case, enters a particular billing code (block 529) in the CF message to indicate that the call is to be charged to the called subscriber. Otherwise, the program (block 530) enters a different billing code to indicate that the call is to be charged to the calling party. The program then sends the message (block 531) over the data path from which it received the original calling information, e.g., path 107 to OSPS 105. The program then exits.

If the program (block 524) finds that the call is to be forwarded to other than the subscriber's home telephone number, then it unloads the telephone number stored in the CFNUM. 1 field of the associated subscriber record (block 532) and then proceeds in the manner described above (i.e., proceeds to block 526). It is noted that in this instance, the call is forwarded to the first call forwarding number, but will not be forwarded thereafter to a second call forwarding number if the called number is busy or the subscriber is unavailable at the called location. The reason for this is that call sequencing is not active. However, if the CALL. SEQ field of the associated subscriber record indicates that call sequencing is active, then the program transmits (block 535) over the channel carrying the call an announcement indicating that call sequencing is active, as mentioned above. An illustrative example of the announcement that the program (block 525) presents to the caller may be as follows:

> "This is the personalized calling service. The party you have called has specified a list of telephone numbers at which that party may be reached. These telephone numbers can be tried in sequence. To cause your call to proceed to the next number on the list, even if the call has been answered, press "star pound" at any time. If a particular telephone number does not answer, the next number will be tried automatically after 5 rings, even if "star pound" has not been entered. Trying the first number now."

However, before transmitting the announcement, the program unloads (block 533) the telephone number stored in the CFNUM1 field of the associated record, e.g., the telephone number of station S4 and then forms a Call Sequencing (CS) message (block 534). (The content of a CS message is similar to that of a CF message, except that the message type is directed to call sequencing.)

The program (block 528) then checks to see if the caller had entered an associated identifier, i.e. a CIN. If that is the case, then the program inserts an indicator in the message (block 529) to note that the call is to be charged to the subscriber's personal telephone number. Otherwise, the inserted indicator notes that the caller is to be charged for the call (block 530). The program then sends (block 531) the message to OSPS 105 via path 107 and then exits.

In response to receipt of the adjunct 150 message, the OSPS program (block 600, FIG. 6) stores the contents of the message in a call record that it associates with the call (block 601). The program then causes OSPS 105 to forward the call to the destination identified by the call forwarding number contained in the message (block 602). The program then passes control of the call to a conventional call processing program if the received message does not indicate that call sequencing is in effect (blocks 603 and 603-1). Otherwise, the program begins monitoring the call connection (block 604) for the receipt of the *# signals, indicating that the caller has entered a request for call sequencing. During such monitoring, there is a good chance that someone other than the subscriber may answer the call at the called destination and then, after talking with the calling party, terminate the call by "hanging up". If such an event occurs, then, the CO serving the called station will notify the destination toll switch, e.g., TS 120, of that fact in a conventional manner. The latter toll switch, in turn, sends a disconnect message to OSPS 105. Accordingly, during such monitoring, the program (block 604-1) checks for the receipt of a disconnect message from the destination toll switch and disconnects the forward connection (block 604-2) to the destination switch if it receives such a message. Otherwise, the program (block 605) checks to see if it received a request for call sequencing. If it did not receive such a request, then the program (block 607) checks to see if the calling party has terminated the call and continues monitoring the call (block 604) if that is not the case. However, if the program finds that the calling party has terminated the call, then the program completes a conventional billing record (block 608) if the call had been completed. The program then stores the record in a billing database whose contents is later processed by a billing center for the billing of respective telephone calls. The program (block 609) then terminates the call and then exits.

Assuming that the caller enters a request for call sequencing, or if the called telephone number has been ringing for 5 rings without having been answered, then the OSPS program (block 610, FIG. 7) disconnects the call forward connection to the destination toll switch (if it had not been previously disconnected (block 6042)) and then unloads the associated call record from memory (block 611 ). The program then sets (blocks 612 and 614) a "software flag" to a predetermined value if the call was completed. Otherwise, the program clears the flag (blocks 612 and 613). The program then creates a billing record (block 615) and notes therein whether or not the associated call had been completed based on the value of the aforementioned flag. The program then stores the billing record in an associated database, as mentioned above. The program then forms a CS message (block 617) and supplies the message to adjunct 150 over the associated data path, e.g., path 107 (block 618). The program then exits.

Figure 8:
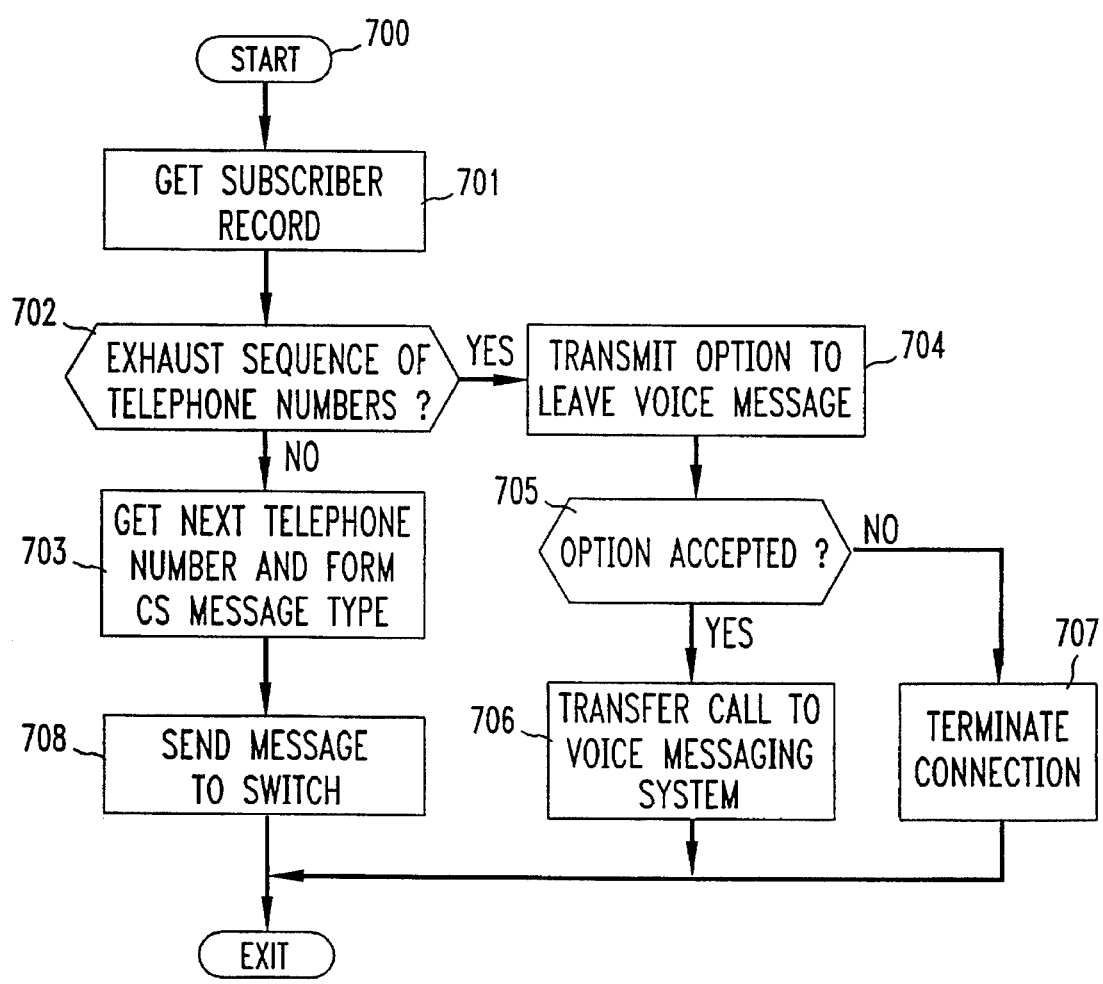

Upon receipt of a CS request message from OSPS 105 (sent at block 618, FIG. 7), the adjunct 150 program gets of copy the subscriber record associated with the service telephone number contained in the CS message (block 701, FIG. 8). The program then compares the called number contained in the message with the telephone numbers contained in the CFNUM. 1-3 fields of the associated record (block 703), in the order determined by the predetermined sequence, until it finds a match. If the match is with the last number of the sequence, this means that all the numbers have been tried, that is, the sequence has been exhausted. If this is the case (block 702), the program transmits an announcement (block 704) over the channel identified in the CF message to present the caller with the option of leaving a voice message for the called service subscriber. If the calling party accepts the option (block 705) by the entering of the appropriate keypad (MF) character, e.g., the pound (#) sign, then the program forms a message containing, inter alia, the telephone number of the called subscriber's voice message service and a request to forward the call to the identified telephone number and sends the message to OSPS 105 (block 706). OSPS 105, in turn, disconnects the call from adjunct 150 and forwards the call to the called destination. The program then exits. If the subscriber does not accept the option, then the program terminates the connection (block 707) by sending a disconnect message to OSPS 105.

If the matched number is not the last number in the sequence, then the program sends a CF call set-up message (block 703) containing the next number in the sequence to OSPS 105 (block 708). The program then exits, thereby relinquishing control of the call to OSPS 105. OSPS 105, in turn, forwards the associated call to the destination identified by the latter number, as described above.

If the program (block 522, FIG. 4) finds that the number entered by the caller contains five digits, then the program concludes that the calling party is the subscriber and transmits (block 527) announcement (1) to the subscriber via the path 106 T1 channel. The program then waits for the subscriber's selection (entry). Upon receipt of the entry, the program proceeds to an appropriate sub-program (block 532-1,532-2, 532-3, 532-4 or 532-5) to process the subscriber's selection, in the manner discussed above.

Figure 9:
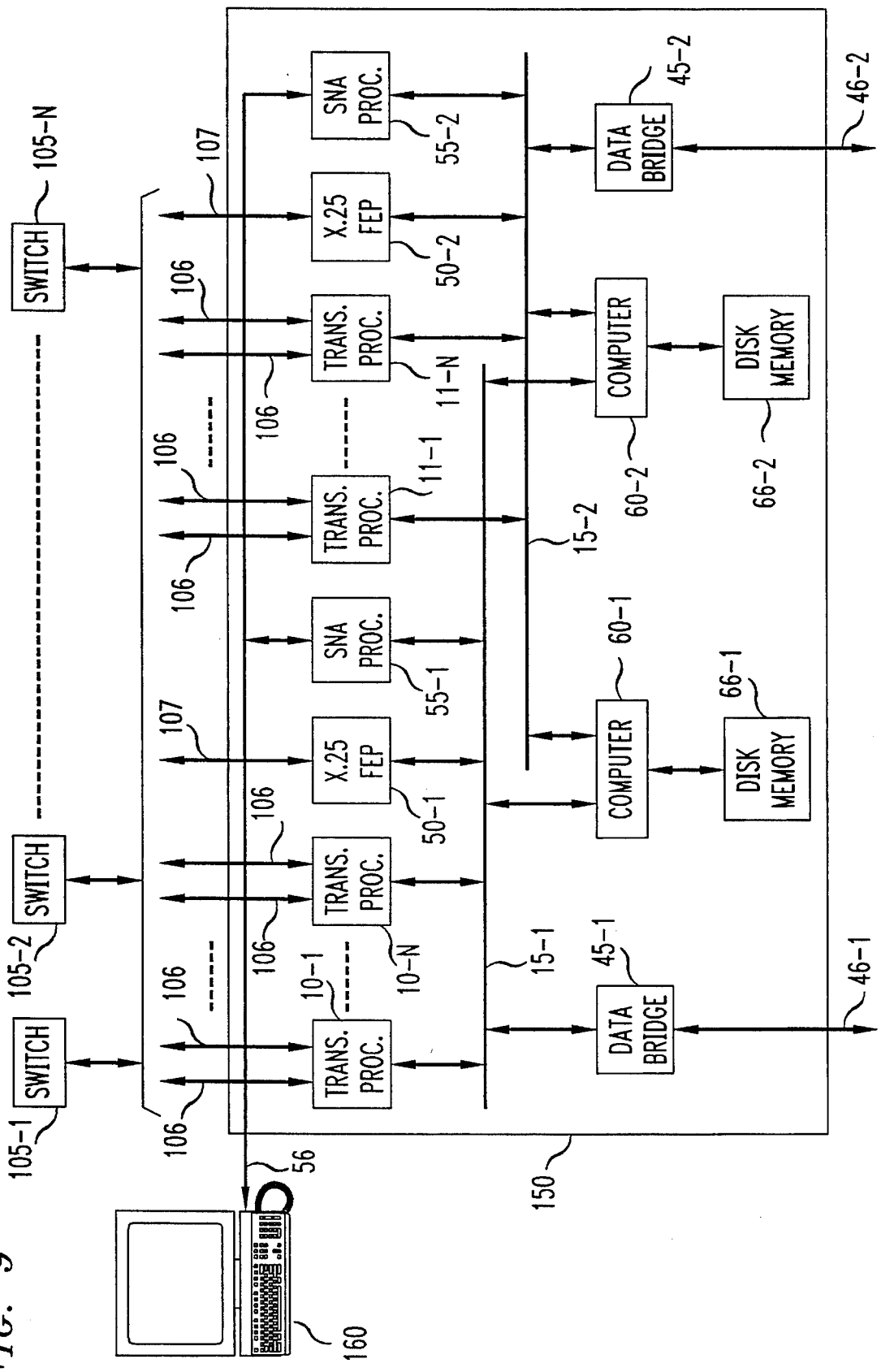
FIG. 9 is a block diagram of the service adjunct.

One possible preferred embodiment of adjunct 150 is shown in FIG. 9. Specifically, adjunct 150 connects to a plurality of network 100 switches 105. In an illustrative alternative embodiment of adjunct 150, each such switch 105 may be the well-known No. 5ESS switch available from AT&T. To enhance its reliability, adjunct 150 comprises two sections, in which a component in one such section is duplicated in the other such section. Accordingly, a discussion of one section adjunct 150 equally pertains to the other section.

In particular, each such section includes a group of transaction processors 10(11) each of which connects to a respective one of switches 105 via associated communications paths 106. As mentioned above, a communications path 106 may be, for example, a so-called T1 carder line. As is well-known, a T1 carrier line provides a plurality of channels for carrying respective telephone calls. Each such section also includes an X.25 Front End Processor (FEP) 50, SNA processor 55, LAN 15, and a computer 60 associated with a disk memory 66. The X.25 FEP 50 implements the well-known X.25 data transmission protocol and is the means by which an associated section of adjunct 150 exchanges call signaling information with an OSPS. That is, X.25 Flip 50 is arranged so that it supplies to its associated computer 60 via LAN 15 call signaling information that FEP 50 receives from a respective one of the switches 105. Similarly, X.25 Flip 50 supplies to a respective one of the switches 105 call signaling information that Flip 50 receives from an associated computer 60 via LAN 15. In this respect, X.25 FEP 50 connects to each of the switches 105 that connect to the associated section transaction processor 10. The connection between X.25 Flip 50 and such switches 105 is represented in the FIG. by path 107.

The processing of incoming and outgoing calls and associated call information, as well as data base management of subscriber records stored in a disk memory 66, is handled by the associated computer 60, which may be, for example, the Digital Equipment Corporation VAX-9000. In this respect, computer 60 is at the heart of adjunct 150, whereas transaction processors 10 ( 11 ) and X.25 FEP 50 serve to interface their associated computer 60 with switches 105. In addition, and as a means of further improving the redundancy of adjunct 150, each computer 60 is connected to each LAN 15, as shown in the FIG.

As mentioned above, a new subscriber record is inputted by an attendant operating terminal 160. Terminal 160 connects to each section of adjunct 150 via a respective SNA processor 50. Each SNA processor 50 implements the well-known IBM SNA protocol, and is used to interface terminal 160 with a respective computer 60. Thus, a newly inputted subscriber record is passed to both computers 60 via their respective SNA processors 50 and LANs 15. Both of the computers 60, in turn, store the new record, or a change to an existing record, in their respective disk memories 66. A computer 60 may also receive from another adjunct 150 via the associated data bridge 45 a new subscriber record, or a change to an existing record. In this way, each adjunct 150 maintains an updated copy of each subscriber record, as mentioned above.

Figure 10:
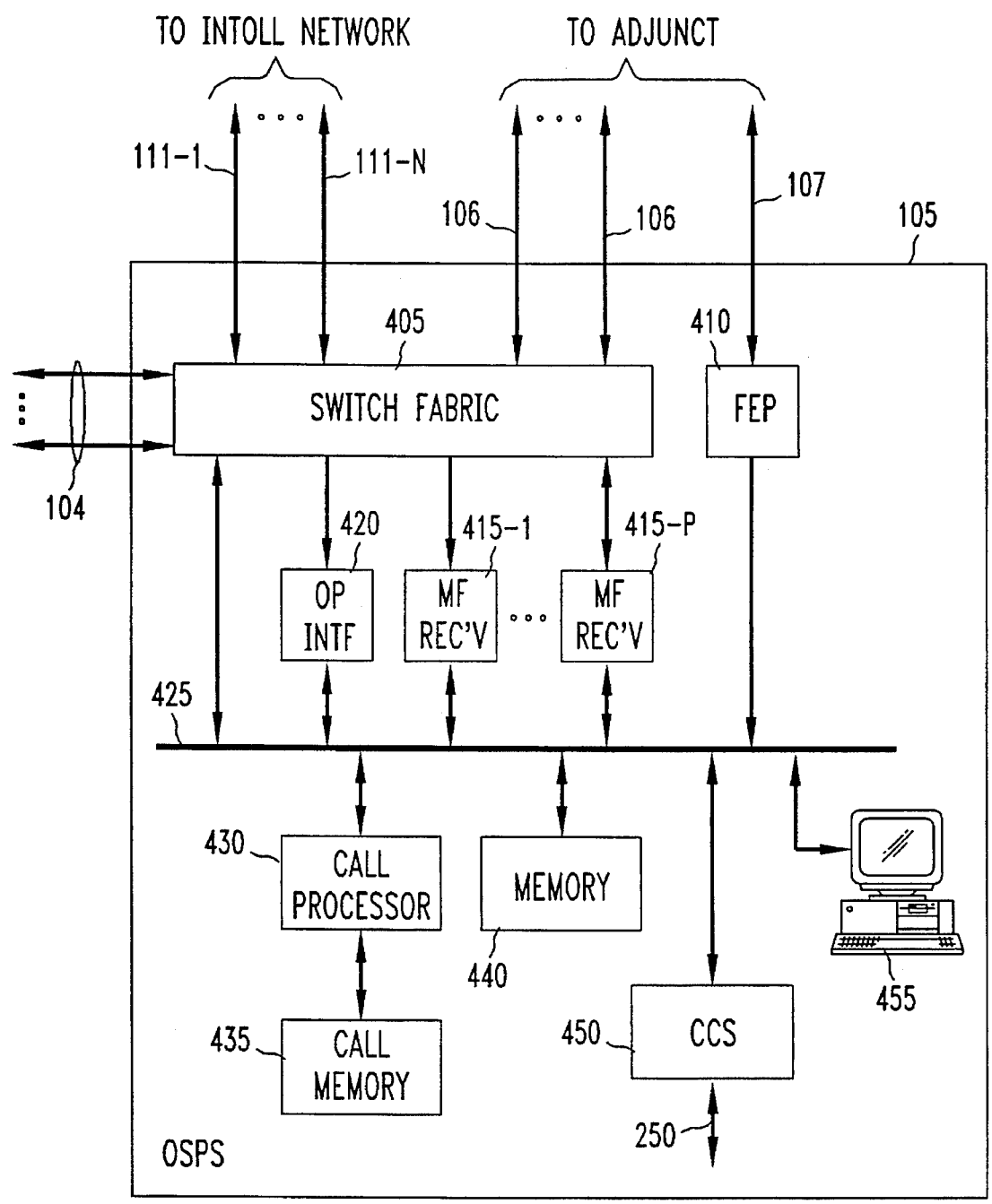
FIG. 10 is a broad block diagram of the OSPS.

Turning now to FIG. 10, them is shown a broad block diagram of OSPS 105, which includes call processor 430 and switch fabric 405. Call processor 430, more particularly, controls the overall functions performed by OSPS 105 and does so at the direction of a call processor program stored in call memory 435. Such functions include conventional telephone operator services as well as interfacing with adjunct 150 in the manner described above. Such interfacing includes, more particularly, communications paths 106-1 through 106-N and Front End Processor (FEP) 410. Specifically, telephone calls received via one of the paths 104 extending to one or more COs are presented to switch fabric 405. Switch fabric, responsive thereto, supplies the associated calling information to call processor 430 via bus 425. As mentioned above, such calling information may include a called number associated with adjunct 150. If that is the case, i.e., the called number includes a 700 prefix, then processor 430 directs switch 405 to route the call to adjunct 150 via one of the communications paths 106-1 through 106-M. In doing so, processor 430 supplies the associated calling information as well as the aforementioned call identifier to FEP 410 via bus 425 for delivery to adjunct 150 via data path 107, as mentioned above. As also mentioned above, the OSPS, i.e., processor 430, associates the call with a call record which is stored in memory 440. Alternatively, Flip 410 supplies messages that it receives via path 107, e.g. a CS message, to call processor 430 via bus 425. Processor 430, in turn, processes the message in accordance with the program described above and which is stored in call memory 435.

More particularly, for a CS message in which the call connection to the caller will be monitored for the entry of a call sequencing request, processor 430 causes switch 405 to bridge one of the MF receivers 415-1 through 415-P onto the connection. In this way, the connection is monitored for the entry of such a request, as discussed above. When the connected receiver detects the presence of the signals characterizing the request, it then notifies processor 430 thereof via bus 425. When processor 430 is satisfied that the request is legitimate, it then notifies adjunct 150 of that fact via Flip 410. In addition, processor 430 changes the configuration of the established connection to disconnect the called party, if need be, and reconnect the caller to adjunct 150, as described above.

If the aforementioned message is a conventional call-connection message from adjunct 150 to forward the call to an identified destination, then processor 430 directs switch 405 to disconnect the call from path 106. Processor 430 then directs switch 405 to establish a connection between the incoming call connection and the appropriate one of the intertoll network paths 111 as a way of forwarding the call to its intended destination. In doing so, processor sends a so-called CCS message identifying the call to the destination via CCS network interface 450 and CCS network 250.

Processor 430, on the other hand, mutes incoming calls that are not accompanied by the 700 prefix to one of plurality of telephone operators via interface, or trunk 420. Such operators are represented in the FIG. by operator position 455 which processes such incoming calls in a conventional manner.

The foregoing merely illustrates the principles of the invention. It will thus be appreciated that those skilled in the art will be able to devise numerous arrangements which, although not explicitly shown or described herein, embody the principles of the invention and are thus within their spirit and scope. For example, it can be appreciated that adjunct 150 may be readily adapted so that it first routes a call to the subscriber's home telephone when the call sequencing feature is active, and then routes the call to the telephone numbers in the sequence. In addition, although the invention was discussed in terms of a caller entering particular telephone keypad signals to request call sequencing, it is clear that an OSPS may employ so-called speaker-independent recognition equipment to allow a caller to enter such a request by saying it. Such equipment is readily available and employs word-spotting algorithms which may be adapted to spot such words as "call" and "sequencing". Also, the foregoing may be readily adapted so that it (a) accepts a request for call sequencing from either the calling or called party, (b) creates a billing record only for the last answered call in the sequence, placed to one of the associated call forwarding numbers, or (c) automatically places a telephone call in sequence to each of the call forwarding telephone numbers, even after one of them has been answered, to eliminate the need for the calling (or called) party to enter a request for call sequencing. Moreover, the foregoing may be readily adapted so that if call sequencing is active and a caller "hangs up" before all of the call forwarding telephone numbers are tried, but redials the subscriber's personal septice number within a predetermined period of time, then presenting the caller with the option of continuing call sequencing as though the caller did not "hang up". Alternatively, if, again, call sequencing is active and a caller "hangs up" before all of the call forwarding numbers are tried, the system may immediately ring the caller's telephone and, upon that telephone being answered, announce to the caller that there are other untried numbers on the list and that, unless the caller "hangs up" at this point, the next number on this list will be tried.

Although the menu of choices in the present illustrative embodiment treats single-call call forwarding (choice "2" of the main menu) and call sequencing (choice "5") as separately administered functions, they could be combined into a single call forwarding function in which the forwarding specified by the subscriber is either to a single telephone number or to a sequence. Moreover, the system could be arranged so as to allow the subscriber to define a plurality of call forwarding sequences, a particular one of which could then be made active at the subscriber's request by identifying it with an identifying code.

In the present illustrative embodiment, a caller is provided with a call sequencing announcement and instructions only at the beginning of the call. In other embodiments, however, such announcements and/or instructions could be presented at various opportune points throughout the call, such as upon called-party termination of any call in the sequence that was answered.

I claim:

1. A method, for use in a telecommunications system, for automatically routing a call made to a particular called number in accordance with a previously stored sequence of telephone numbers, the method comprising the steps of:

retrieving said sequence of telephone numbers in response to receipt of said called number, and in response to a signal supplied by said caller, routing said call to a particular one of said telephone numbers of the retrieved sequence even if said call was completed to a previous telephone number in said sequence.

2. The method of claim 1 wherein said signal is input from a telephone keypad.

3. The method of claim 1 wherein said signal is a command spoken by said caller.

4. The method of claim 1 wherein said called number is a telephone service number.

5. A method comprising the steps of:

storing, in association with each of a plurality of subscriber telephone numbers, first and second call forwarding telephone numbers, in response to a call initiated after said storing step from a caller to a particular one of said subscriber telephone numbers extending said call to the associated first call forwarding telephone number, and in response to a signal supplied by said caller, extending said call to said second call forwarding telephone number after said call has been completed to said first call forwarding number.

6. A method for use in a telecommunications system in which an incoming telephone call originated by a caller is routed in accordance with a sequence of telephone numbers specified by a subscriber, the method comprising the steps of:

retrieving said sequence of telephone numbers in response to receipt of said incoming telephone call;

selecting one of said sequence of telephone numbers and routing said incoming call in accordance with the selected telephone number, responsive to a signal supplied by said caller, selecting a next one of said sequence of telephone numbers, and routing said incoming call in accordance with said next one of said sequence of telephone numbers even though the call placed to the previous selected telephone number had been completed.

7. A method for use in a telecommunications system in which a telephone call, placed by a caller from a telephone set to a subscriber by putting the telephone set in an off-hook state and by thereafter dialing a particular subscriber telephone number, is routed to a sequence of telephone numbers previously specified by said subscriber, while said telephone set is maintained in an off-hook state, the method comprising the steps of:

retrieving said sequence of telephone numbers in response to said dialing of said telephone call, and in response to an indication supplied by said caller, routing said telephone call to a particular one of said telephone numbers of said sequence even if said call was completed to a previous telephone number in said sequence.

8. The method of claim 7 wherein said indication is a signal input from a telephone keypad.

9. The invention of claim 7 wherein said indication is a command spoken by said caller.

10. A method for use in a telecommunications system of a type in which, during a single telephone call placed by a caller from a calling telephone set by dialing a particular telephone number, attempts are made to connect said calling telephone set with each location of a predetermined sequence of call forwarding locations previously specified by a subscriber associated with said particular telephone number, the method comprising the steps of:

retrieving said predetermined sequence of call forwarding locations in response to said telephone call, and in response to an indication from said caller, connecting said calling telephone set to a particular one of said call forwarding locations of said sequence even if said call was completed to a previous call forwarding location of said sequence.

11. The method of claim 10 wherein said indication is a signal input from a telephone keypad.

12. The method of claim 10 wherein said indication is a command spoken by said caller.

13. A method of a type in which, when a telephone call to a subscriber is initiated by a caller from a calling telephone set by dialing a particular subscriber telephone number, telephone switching equipment responds to the dialing of said particular subscriber telephone number by routing the call to a sequence of telephone numbers previously specified by said subscriber, where, in said method, while a connection between said telephone switch and said calling telephone set is maintained, said telephone call is routed to a particular one of the telephone numbers of said sequence, even if said call was completed to a previous telephone number of said sequence, said telephone call being routed to said particular one of said telephone numbers in response to an indication from said caller.

14. The method of claim 13 wherein said indication is a signal input from a telephone keypad.

15. The method of claim 13 wherein said indication is a command spoken by said caller.

16. The method of claim 13 wherein said subscriber telephone number contains a prefix, "700".

17. A method for use in a telecommunications system comprising the steps of:

a) establishing in response to dialing subscriber a telephone number from a calling telephone station, a connection between said calling telephone station and a telecommunications switching apparatus within said telecommunications system, b) extending a forward connection from said telecommunications switching apparatus to a first call forwarding telephone station previously specified as being associated with said subscriber telephone number so as to establish a connection between said calling telephone station and said first call forwarding telephone station, c) monitoring said connection between said calling telephone station and said telecommunications switching apparatus for an appearance on said connection of a call sequencing request from said calling telephone station, and d) if said call sequencing request does appear on said connection between said telephone station and said telecommunications switching apparatus, maintaining that connection and extending a forward connection from said telecommunications switching apparatus to a second call forwarding telephone station previously specified as being associated with said subscriber telephone number so as to establish a connection between said calling telephone station and said second call forwarding telephone station, e) steps c) and d) being carried out even after any answering by said first call forwarding telephone station in response to the extending of said forward connection thereto.

18. The method of claim 17 wherein steps c) and d) are carried out even after said first call forwarding telephone station is hung up after having been answered.

19. A method for use in a telecommunications system in which a plurality of sequences of telephone numbers are each stored in association with a respective one of a plurality of called numbers, the method comprising the steps of:

retrieving, in response to the placing of a call by a calling party to a particular one of said called numbers, the associated one of said plurality of sequences of telephone numbers; and in response to a signal supplied by said calling party, routing said call to said sequence of telephone numbers, said call being routed to a particular one of said telephone numbers of the retrieved sequence even if said call was completed to a previous telephone number in said sequence.

20. The method of claim 19 wherein each one of said plurality of called numbers contains a three-character prefix which identifies a particular type of personal telephone service.

* * * * *